United States Patent
Oghena et al.

(10) Patent No.: US 10,266,750 B2
(45) Date of Patent: Apr. 23, 2019

(54) OIL RECOVERY COMPOSITIONS AND METHODS THEREOF

(71) Applicant: Chevron U.S.A. Inc., San Ramon, CA (US)

(72) Inventors: Andrew Oghena, Houston, TX (US); Rushan R. Sakhibgareev, Spring, TX (US)

(73) Assignee: CHEVRON U.S.A. INC., San Ramon, CA (US)

( * ) Notice: Subject to any disclaimer, the term of this patent is extended or adjusted under 35 U.S.C. 154(b) by 0 days.

(21) Appl. No.: 15/255,709

(22) Filed: Sep. 2, 2016

(65) Prior Publication Data

US 2017/0058186 A1    Mar. 2, 2017

Related U.S. Application Data

(60) Provisional application No. 62/213,236, filed on Sep. 2, 2015.

(51) Int. Cl.
| | | |
|---|---|---|
| *E21B 37/06* | (2006.01) | |
| *C09K 8/58* | (2006.01) | |
| *C09K 8/524* | (2006.01) | |
| *C09K 8/594* | (2006.01) | |
| *C09K 8/592* | (2006.01) | |
| *C09K 8/584* | (2006.01) | |
| *C09K 8/588* | (2006.01) | |

(52) U.S. Cl.
CPC .............. *C09K 8/58* (2013.01); *C09K 8/524* (2013.01); *C09K 8/584* (2013.01); *C09K 8/588* (2013.01); *C09K 8/592* (2013.01); *C09K 8/594* (2013.01); *E21B 37/06* (2013.01); *C09K 2208/10* (2013.01)

(58) Field of Classification Search
None
See application file for complete search history.

(56) References Cited

U.S. PATENT DOCUMENTS

| 8,147,802 B2 | 4/2012 | Ding et al. |
|---|---|---|
| 8,415,267 B2 | 4/2013 | Lee |

(Continued)

FOREIGN PATENT DOCUMENTS

WO    2015/175432 A1    11/2015

*Primary Examiner* — Andrew Sue-Ako (57) ABSTRACT

Asphaltene formation in a hydrocarbon-bearing zone is mitigated with the injection of nanoparticles. In one embodiment, a method of mitigating asphaltene formation comprises: providing an injection fluid comprising water, foam, carbon dioxide, natural gas, methane, ethane, nitrogen, propane, butane, flue gas, exhaust gas, steam, alkali, polymer, surfactant, or any combination thereof; providing nanoparticles, wherein the nanoparticles comprise nickel oxide, alumina, silica, silicate based, iron oxide (Fe3O4), impregnated nickel on alumina, synthetic clay, iron zinc sulfide, magnetite, iron octanoate, or any combination thereof; injecting a combination of the injection fluid and the nanoparticles into a hydrocarbon-bearing zone, wherein the nanoparticles are injected such that asphaltene formation is reduced compared to injection without the nanoparticles; and recovering fluids produced from the hydrocarbon-bearing zone, the fluids having a reduced concentration of asphaltenes compared to injection without the nanoparticles.

39 Claims, 1 Drawing Sheet

(56) References Cited

U.S. PATENT DOCUMENTS

| | | | |
|---|---|---|---|
| 2008/0142230 A1* | 6/2008 | Lau | C09K 8/582 |
| | | | 166/401 |
| 2010/0243248 A1* | 9/2010 | Golomb | C09K 8/58 |
| | | | 166/270 |
| 2011/0028662 A1 | 2/2011 | Wiesner et al. | |
| 2011/0033694 A1 | 2/2011 | Jing et al. | |
| 2012/0015852 A1 | 1/2012 | Quintero et al. | |
| 2013/0334097 A1* | 12/2013 | Patino | B01J 21/04 |
| | | | 208/14 |
| 2014/0187449 A1 | 7/2014 | Khabashesku et al. | |
| 2014/0209305 A1 | 7/2014 | Lin et al. | |
| 2015/0114635 A1 | 4/2015 | Ovalles et al. | |
| 2015/0144344 A1 | 5/2015 | Mazyar et al. | |
| 2016/0115371 A1 | 4/2016 | Johnson et al. | |

* cited by examiner

OIL RECOVERY COMPOSITIONS AND METHODS THEREOF

CROSS REFERENCES TO RELATED APPLICATIONS

This application claims benefit under 35 USC 119 of U.S. Provisional Patent Application No. 62/213,236 with a filing date of Sep. 2, 2015, which is incorporated herein by reference in its entirety.

TECHNICAL FIELD

The present disclosure generally relates to compositions and methods for use in improved and/or enhanced oil recovery, and systems thereof.

BACKGROUND

Reservoir systems, such as petroleum reservoirs, typically contain fluids such as water and a mixture of hydrocarbons such as oil and gas. To remove ("produce") the hydrocarbons from the reservoir, different mechanisms can be utilized such as primary, secondary or tertiary processes. In a primary recovery process, hydrocarbons are displaced from a reservoir through the high natural differential pressure between the reservoir and the bottom-hole pressure within a wellbore. In order to increase the production life of the reservoir, secondary or tertiary recovery processes can be used ("improved oil recovery" or IOR, or "enhanced oil recovery" or EOR). Secondary recovery processes include continuous water or gas (e.g., $N_2$ natural gas, and/or $CO_2$) well injection or combination of both water and gas, steam injection, and/or injecting additional chemical compounds into the reservoirs such as surfactants and polymers, while tertiary methods are based on secondary water injection followed by gas injection for additional recovery.

Deepwater reservoirs have become the leading potential regions among the newly developed oil and gas reservoirs all over the world. The development and utilization of the deepwater oil-gas resources are considered an important strategy to implement the sustainable economic development and ensure the energy security by many countries. One challenge in carrying out deepwater EOR processes is asphaltene precipitation. Studies have been conducted showing that asphaltene deposition is caused by the changes of pressure and temperature during deepwater operations. Also, laboratory investigations have demonstrated that when gas is injected into the oil, it causes precipitation of asphaltene due to composition changes.

Although there are well-known remediation methods for mitigating asphaltene deposition (e.g., via chemical injection, mechanical, or thermal operations in the well), there is a need for improved compositions and methods to mitigate asphaltene deposition in IOR/EOR operations, particularly in deepwater operations. This is due to the fact that conventional asphaltene mitigation methods do not yield long lasting remediation of the asphaltene issue.

SUMMARY

In one embodiment, a method of mitigating asphaltene formation comprises: providing an injection fluid comprising water, foam, carbon dioxide, natural gas, methane, ethane, nitrogen, propane, butane, flue gas, exhaust gas, steam, alkali, polymer, surfactant, or any combination thereof; providing nanoparticles, wherein the nanoparticles comprise nickel oxide, alumina, silica, silicate based, iron oxide ($Fe_3O_4$), impregnated nickel on alumina, synthetic clay, iron zinc sulfide, magnetite, iron octanoate, or any combination thereof; injecting a combination of the injection fluid and the nanoparticles into a hydrocarbon-bearing zone, wherein the nanoparticles are injected such that asphaltene formation is reduced compared to injection without the nanoparticles; and recovering fluids produced from the hydrocarbon-bearing zone, the fluids having a reduced concentration of asphaltenes compared to injection without the nanoparticles.

DETAILED DESCRIPTION

The following terms will be used throughout the specification and will have the following meanings unless otherwise indicated.

"A" or "an" means "at least one" or "one or more" unless otherwise indicated. As used herein "multi-" or "plurality" refers to 2 or more.

"Comprise", "have", "include" and "contain" (and their variants) are open-ended linking verbs and allow the addition of other elements when used in a claim.

"Consisting of" is closed, and excludes all additional elements.

"Consisting essentially of" excludes additional material elements, but allows the inclusions of non-material elements that do not substantially change the nature of the invention.

"Effective amount" or "sufficient amount" refer to an amount sufficient to effect a measurable difference over not including the amount. For example, an effective amount of solvent in an injection stream would increase oil recovery over only using the equivalent injection stream without the solvent.

"Reservoir," "formation," "hydrocarbon-bearing zone," and the like refer to practically any rock matrix that includes hydrocarbons. In some embodiments, the reservoir may be divided into hydrocarbon bearing zones, or the reservoir may be considered to be one hydrocarbon-bearing zone. Nonetheless, a combination of an injection stream and nanoparticles may be injected into the hydrocarbon-bearing zone (e.g., via at least one injection well) to produce the hydrocarbons in the hydrocarbon-bearing zone (e.g., via at least one production well). In addition to the hydrocarbons and the rock matrix, the hydrocarbon-bearing zone may include pore space, water (e.g., formation water or connate water), etc. The terms are not limited to any structure and configuration described herein.

"Hydrocarbon" or "hydrocarbonaceous" or "petroleum" or "crudes" or "crude oil" or "oil" may be used interchangeably to refer to carbonaceous material originating from subterranean sources as well as synthetic hydrocarbon products, including organic liquids or gases, kerogen, bitumen, crude oil, natural gas or from biological processes, that is principally hydrogen and carbon, with significantly smaller amounts (if any) of heteroatoms such as nitrogen, oxygen and sulfur, and, in some cases, also containing small amounts of metals. One measure of the heaviness or lightness of a liquid petroleum is American Petroleum Institute (API) gravity. According to this scale, light crude oil is defined as having an API gravity greater than 31.1° API (less than 870 kg/m3), medium oil is defined as having an API gravity between 22.3° API and 31.1° API (870 to 920 kg/m3), heavy crude oil is defined as having an API gravity between 10.0° API and 22.3° API (920 to 1000 kg/m3), and extra heavy oil is defined with API gravity below 10.0° API (greater than 1000 kg/m3). Heavy crude oil and extra heavy crude oil are both examples of hydrocarbons. The terms are not limited to any embodiments provided herein.

"Well" and "wellbore" are used interchangeably to denote a borehole extending from the earth surface to a subterranean formation and at least partially in fluid communication with a reservoir. Depending on the embodiment, a wellbore can be used for injection, production, or both. The wellbore may include casing, liner, tubing, other items, or any combination thereof. The wellbore may include an open hole portion or uncased portion. The wellbore may be vertical, inclined, horizontal, combination trajectories, etc. The wellbore may include any completion hardware that is not discussed separately. The term wellbore is not limited to any structure and configuration described herein. A "production well" or "production wellbore" enables the removal of fluids from the hydrocarbon-bearing zone to the surface and an "injection well" or "injection wellbore" enables the placement of fluid into the hydrocarbon-bearing zone from the surface.

"Slug" refers to an amount of a composition that is to be injected into a subterranean reservoir.

"Miscible" refers to forming a homogeneous mixture when two or more liquids are mixed together.

"Immiscible" refers to NOT forming a homogeneous mixture when two or more liquids are mixed together. Immiscible liquids that are shaken together eventually separate into layers or phases, e.g., an oil phase or layer and a water phase or layer.

"Pore volume" or "PV" fraction as used herein refers to the total volume of pore space in the oil reservoir that is contemplated in a reservoir sweep with an injection stream, e.g., water injection or gas injection.

"Asphaltenes" (or asphaltene) are defined as the fraction of oil, bitumen, or vacuum residue that is insoluble in low-molecular-weight paraffins, such as n-heptane or n-pentane, yet is soluble in light aromatic hydrocarbons such toluene, pyridine, or benzene. Asphaltenes have a tendency to form colloidal aggregates and to adsorb onto rock surfaces. In one embodiment, the asphaltenes structure is formed by polyaromatic cores attached to aliphatic chains containing heteroatoms, such as nitrogen, oxygen, and sulfur, in addition to metals such as vanadium and nickel.

"Brine" refers to practically any liquid that may be injected into a hydrocarbon-bearing zone. The brine may be surface water, water recovered from a production wellbore, sea water, produced formation brine, formation brine, fresh water, produced water, water, saltwater, synthetic brine, synthetic seawater brine, or any combination thereof. In some embodiments, brines may include, but are not necessarily limited to, heavy brines, monovalent brines, divalent brines, and trivalent brines that comprise soluble salts like sodium chloride, calcium chloride, calcium bromide, zinc bromide, potassium carbonate, sodium formate, potassium formate, cesium formate, sodium acetate, potassium acetate, calcium acetate, ammonium acetate, ammonium chloride, ammonium bromide, sodium nitrate, potassium nitrate, ammonium nitrate, ammonium sulfate, calcium nitrate, sodium carbonate, potassium carbonate, any derivative thereof, or any combination thereof.

"Injection fluid" refers to a fluid that will be injected into a hydrocarbon-bearing zone, for example, via a wellbore, such as an injection wellbore. An injection fluid can comprise water, foam, carbon dioxide, natural gas, methane, ethane, nitrogen, propane, butane, flue gas, exhaust gas, steam, alkali, polymer, surfactant, or any combination thereof. In some embodiments, the injection fluid further comprises an additive. The additive comprises surfactants, monovalent ions, multivalent ions, polymers, or any combination thereof. In some embodiments, the injection fluid comprises natural gas, carbon dioxide, nitrogen, or any combination thereof under critical or supercritical condition such that the injection gas is a dense fluid. In some embodiments, the injection fluid comprises a combination of water and gas, where the water corresponds to a water injection well and the gas corresponds to a gas injection well, as in a double displacement process.

Nanoparticles may be combined with the injection fluid, and the combination of injection fluid and nanoparticles may be injected into a hydrocarbon-bearing zone. In some embodiments, the injection fluid may be separate and the nanoparticles may be separate, and the two separate entities may be combined and injected into the hydrocarbon-bearing zone. Alternatively, in some embodiments, the nanoparticles may be added to the injection fluid to combine them (which can be called nanofluid), and then the injection fluid is injected into the hydrocarbon-bearing zone. Those of ordinary skill in the art will appreciate that both scenarios are included in this embodiment. The term "injection fluid" is sometimes used interchangeably with the term "injection stream" or "treatment fluid," but the terms are not limited to the embodiments provided herein.

In one embodiment, a particular injection fluid may include a variety of components. The injection fluid may include a brine component. For example, the injection fluid may include a brine or aqueous phase, but it may also include gas, such as a mixture of brine and gas. The injection fluid may include a polymer component, and the polymer component may include various constituents such as water, mineral oil, one or more solvents, one or more optional additives, or any combination thereof. For example, the injection fluid may include at least one polymer, which may be practically any polymer that may be injected into a hydrocarbon-bearing zone. The injection fluid can be mixed on-site to include the polymer, e.g., by mixing the polymer in the form of a powder, gel, emulsion, or liquid, with a solute such as water. Depending on the specific embodiment, the "polymer" may be a polymer composition, a polymer solution, a polymer suspension, polymer dispersion, a liquid polymer, etc. Thus, the "polymer" itself may be made up of various constituents. The polymer component may include additional and/or alternative constituents as well. The injection fluid may also include a solids component, such as sands, other solids, or any combination thereof. The injection fluid may also include a fourth component, such as one or more solvents, one or more optional additives, or any combination thereof. The fourth component may include additional and/or alternative constituents as well. For example, the polymer component may include surfactant and the fourth component may also include surfactant. The injection fluid may include additional components or fewer than these. Thus, the injection fluid may include a variety of components, and the actual components of the injection fluid may depend, for example, on the hydrocarbon-bearing formation. Furthermore, as discussed hereinabove, the injection fluid may be combined with nanoparticles for injection.

"Nano particles" (or nanoparticles) generally refers to particles having a size of less than 100 nm (i.e., less than or equal to 0.1 μm). However, the nanoparticles are not limited to the embodiments discussed herein.

The disclosure relates to improved compositions and methods to mitigate asphaltene formation in IOR/EOR operations (particularly deepwater operations with gas injection into low permeability reservoirs (e.g., 0.01 to 25 mD), undersaturated oils with medium API gravities (e.g., 23 to 30) and viscosity oil (e.g., less than 20 cP)) with nanoparticles to mitigate/reduce the formation of asphaltenes, thus facilitating improved/enhanced oil recovery processes. Asphaltene formation comprises precipitation, flocculation, deposition, or any combination thereof.

Nanoparticles Composition:

The nanoparticles for use to inhibit and/or mitigate asphaltene formation can comprise nickel oxide, alumina, silica, silicate based, iron oxide (Fe3O4), or any combination thereof. The nanoparticles are characterized as: 1) having large surface to volume ratio; 2) having a high degree of suspension in a fluid (e.g., water, gas under supercritical condition) (e.g., high degree of suspension in a fluid is dependent on the nanoparticles being used and refers to a sufficient amount of suspension so that the nanoparticles being used do not drop and plug the hydrocarbon-bearing zone); 3) having absorption capacity and being catalytically active; 4) can be acidic, basic, or neutral; or any combination thereof. As an example, in one embodiment, the nanoparticles may have a 1) large surface to volume ratio and 4) can be acidic, basic, or neutral. As an example, in another embodiment, the nanoparticles may have a 1) large surface to volume ratio and 4) have absorption capacity and are catalytically active, etc.

For example, regarding the nanoparticles characterized as having large surface to volume ratio, this disclosure includes particle size of 1 nm to 100 nm in a first embodiment; particle size of 1 nm to 90 nm in a second embodiment; particle size of 1 nm to 80 nm in a third embodiment; particle size of 1 nm to 70 nm in a fourth embodiment; particle size of 1 nm to 60 nm in a fifth embodiment; particle size of 1 nm to 50 nm in a sixth embodiment; particle size of 1 nm to 40 nm in a seventh embodiment; particle size of 1 nm to 30 nm in an eighth embodiment; particle size of 1 nm to 20 nm in a ninth embodiment; particle size of 1 nm to 10 nm in a tenth embodiment; particle size of 1 nm to 75 nm in an eleventh embodiment; particle size of 1 nm to 50 nm in a twelfth embodiment; and particle size of 1 nm to 25 nm in a thirteenth embodiment. In yet another embodiment, the nanoparticles are defined as having at least one dimension less than 999 nm, discussed further in U.S. Patent Publication No. 2012/0015852, which is incorporated herein by reference in its entirety. Additionally, the nanoparticles can have a surface area of 1 m2/g to 1800 m2/g in one embodiment; 1 m2/g to 1315 m2/g in a second embodiment; 40 m2/g to 300 m2/g in a third embodiment; about 1 m2/g in a fourth embodiment up to about 1315 m2/g in a fifth embodiment; up to about 1800 m2/g in a sixth embodiment, discussed further in U.S. Patent Publication No. 2012/0015852, which is incorporated herein by reference in its entirety. In some embodiments, the nanoparticles may include particles of the same or similar type. In some embodiments, the nanoparticles may include particles of different types.

In some embodiments, the nanoparticles are surface coated and/or functionalized. The nanoparticles can be coated on all side with the same chemistry in one embodiment, and in another embodiment of a 'Janus' type of coating where the one side of particles is more prone to adsorb to rock surface. The coated nanoparticles in one embodiment are chelator-functionalized silica nanoparticles as disclosed in U.S. Pat. No. 8,147,802B2; having a silica coating for enhanced hydrophilicity as disclosed in U.S. Patent Publication No. 20110033694A1; polyethylene glycol (PEG) coated silica nanoparticles as disclosed in U.S. Patent Publication No. 20110028662A1; a functionalized silicate nanoparticle formed as a reaction product of a silicate nanoparticle and an aromatic compound, and a fluid as disclosed in U.S. Patent Publication No. 20140187449 A1; all of the references are incorporated herein by reference in their entirety. Thus, in some embodiments, the nanoparticles are surface coated with a silica coating, a chelator-functionalized silica coating, a polyethylene glycol coating, a functionalized silicate coating, or any combination thereof.

In one embodiment, the nanoparticles are coated with different inorganic and organic functionalities of various polarities (acidic or base type), allowing the nanoparticles to act as inhibitor or dispersant of asphaltenes. Examples of functionalities include alkylphenol or aldehyde resins and similar sulfonated resins, polyolefin esters, amides, or imides with alkyl, alkylenephenyl, or alkylenepyridyl functional groups, alkenyl and vinilpyrrolidone copolymers, graft polymers of polyolefins, hyperbranched polyester amides, lignosulfonates, alkylaromatics, alylaryl sulfonic acids, phosphoric esters, phosphonocarboxylic acids, sarcosinates, amphoteric surfactants, ether carboxylic acids, aminoalkylene carboxylic acids, alkylphenols and ethoxylates, imidazonlines and alkylamide-imidazolines, alkyl succinimides, alkylpyrrolidones, fatty acid amides and their ethoxylates, fatty esters of polyhydric alcohols, ion-pair salts of imines and organic acids, three ethyl amine group such as triethanolamine lauryl ether sulfate, linear and branched dodecyl benzene sulfonic acid (DBSA), polymers with protic polar heads, or any combination thereof.

In one embodiment, the nanoparticles comprises at least one Group D3 metal oxide nanoparticles supported on alumina nanoparticles, wherein the Group D3 metal is preferably silver, and the weight to weight ratio of alumina nanoparticle to Group D3 metal oxide nanoparticle is in a range of about 80 to 500, and preferably in a range of 99 to about 400. In another embodiment, the nanoparticles comprise nickel oxide nanoparticles supported on alumina nanoparticles. In yet another embodiment, the nanoparticles may be further coated or impregnated with a Group VIIIB or Group IB metal salt, e.g., palladium, platinum, or iron.

In one embodiment, the nanoparticles are of the core-shell nanoparticle type as disclosed in U.S. Pat. No. 8,415,267B2, incorporated herein by reference in its entirety. The nanoparticles comprise a metal core comprising Mn, Fe, Co, Ni, Cu, Zn, Ru, Rh, Pd, Ag, In, Sn, Re, Os, Ir, Pt, Au, a lanthanoid, alloys thereof, or any combination thereof a metal oxide layer at least partially encapsulating the metal core, wherein the metal oxide layer comprises $TiO_2$, $CeO_2$, $V_2O_3$, $ZnO$, $ZrO_2$, $SnO_2$, $WO_3$, $Fe_2O_3$, $V_2O_2$, $MoO_3$, or any combination thereof; and a mesoporous silica layer at least partially encapsulating the metal oxide layer. In another embodiment, the nanoparticles comprise any of synthetic clay (e.g., laponite), iron zinc sulfide, magnetite, iron octanoate, or any combination thereof.

In one embodiment, the nanoparticles are synthesized by a hydrothermal synthesis approach, developed for aluminosilicate gels to obtain commercial zeolite type A. This method employs combination of high concentration of sodium hydroxide with high density gels, allowing the growth of the crystals to be controlled by the polymerization-de-polymerization of the silicate species. The synthesis method further allows surface modification of the nanoparticles to introduce Bronsted acid sites onto the nanoparticle surface, and the incorporation of metals, such as iron, nickel and zirconium.

The nanoparticles can also be applied in a dry form, or they can be incorporated in a solution for incorporation into the injection fluid. The solvent solution is prepared by mixing the nanoparticles in solution in mixing equipment known in the art, e.g., a high capacity pump or a hydraulic paddle mixer. The solvent solution in one embodiment is selected from methanol, toluene, isopropyl alcohol, toluene, hexane, acetone, choloroform, dichloromethane, tributylphosphate, isopropanol, ethyl acetate, alkylbenzene, tetrahydrofuran, acetonitrile, or any combination thereof.

The nanoparticles can be incorporated into the injection fluid at a concentration level ranging from 5 ppm to 200,000 ppm (0.0005% to 20%) in one embodiment; 0.5 to 10 wt. % in a second embodiment; 1 to 5 wt. % in a third embodiment; 0.01 to 5 wt. % in a fourth embodiment; and 0.01 to 10 wt. % in a fifth embodiment. For example, the nanoparticles are at a concentration of between 5 ppm to 200,000 ppm in the combination of the injection fluid and the nanoparticles in one embodiment; the nanoparticles are at a concentration of between 5 ppm to 10,000 ppm in the combination of the injection fluid and the nanoparticles in a second embodiment; the nanoparticles are at a concentration of between 50 ppm to 10,000 ppm in the combination of the injection fluid and the nanoparticles in a third embodiment; the nanoparticles are at a concentration of 0.01 weight percent in the combination of the injection fluid and the nanoparticles in a fourth embodiment; and the nanoparticles are at a concentration of 0.001 to 0.1 weight percent in the combination of the injection fluid and the nanoparticles.

The nanoparticles concentration can be injected into the wellbore all at once to mitigate asphaltene formation, or spread in small doses over a period of time for the life of a recovery project.

The injection fluid can be any of water, foam, or slugs of a gas such as carbon dioxide, natural gas, methane, ethane propane, butane, flue or exhaust gas, or mixtures thereof as a dense fluid, liquefied petroleum gas, or mixtures of gas and water thereof. The injection in one embodiment is a gas at any of critical and subcritical conditions (e.g., a supercritical fluid).

The nanoparticles can be pre-mixed with the injection fluid in any of continuous or batch mode prior to injection, in high pressure tanks at topside/surface facilities before going into the injection line. In another embodiment, the nanoparticles in concentrated liquid form are mixed on the fly, or co-injected with the injection fluid into the formation with or without an inline mixer.

Depending on the injection fluid and methods for IOR/EOR, the nanoparticles can be dispersed in an injection fluid in any or as part of a foam, a liquid phase, a gas phase, a mixture of liquid and gas, etc. The nanoparticles can also be injected in alternating cycles of liquid (water) followed by a gas injection (WAG or water alternating gas), or simultaneous water and gas injection (SWAG), or foam assisted WAG (or FAWAG). In some embodiments, the combination of the injection fluid and the nanoparticles is injected into the hydrocarbon-bearing zone as a discrete slug in a Water-Alternating-Gas (WAG) operation. In some embodiments, the discrete slug containing the nanoparticles is a liquid slug followed by a gas slug without nanoparticles. In some embodiments, the discrete slug containing the nanoparticles is a gas slug followed by a liquid slug without nanoparticles.

General Process:

The nanoparticles are used in methods for improving/enhancing hydrocarbon recovery. The nanoparticles when injected into the reservoir are expected to prevent or mitigate the precipitation of asphaltenes. One of the mechanisms which is the high absorptivity with the ultra small size of the nanoparticles helps quickly absorb the suspended asphaltene particles in the formation. This improves oil mobility and prevents asphaltene aggregation and coagulation. Factors influencing the effectiveness of injecting nanoparticles may include: contact time, asphaltene weight percent and characteristics, nanoparticle size, fluid composition, temperature, pressure, and other existing reservoir properties.

In one embodiment, the process is useful in those reservoirs where injection of water may be too slow to be economic and/or wherein injecting a gas, e.g., natural gas, may be useful to take advantage of higher mobility, miscibility development with the reservoir oil, viscosity reduction, and lower residual oil saturation. The challenging conditions with asphaltene deposition during gas injection may be found offshore, or at depth of at least about 10,000 ft, e.g., at least 20,000 ft. At such depth, the bottom hole injection pressure can be greater than about 15,000 psig, greater than about 20,000 psig, or greater than about 26,000 pisg.

Prior to the injection of the nanoparticles, core samples may be collected to characterize the asphaltenes and understand the deposition mechanisms. A volume of injection fluid containing the nanoparticle composition is calculated for injection into the formation. In one embodiment, the volume is sufficient to provide a radial volume of 5 to 150 ft. surrounding the wellbore in the hydrocarbon-bearing zone, for methods wherein the same wellbore is used for injection as well as production. In another embodiment, the volume is calculated for the effective pore volume based on rock reservoir porosity, e.g., the volume of gas (in supercritical form) in the injection fluid to be from 0.20 to 20 hydrocarbon pore volume percent in one embodiment, 0.5 to 5 hydrocarbon pore volume percent in another embodiment, 0.20 to 15 hydrocarbon pore volume percent in another embodiment, or 0.20 to 10 hydrocarbon pore volume percent in another embodiment. For example, in some embodiments, the injection fluid is injected in a sufficient amount for an effective pore volume based on rock reservoir porosity ranging from 0.20 to 20 hydrocarbon pore volume percent.

The number of discrete slugs of treatment fluid containing the nanoparticle composition can be from 1 to 20 in one embodiment, or from 2 to 8 in a second embodiment. After the injection/treatment, samples of hydrocarbons, e.g., crudes, are collected and analyzed for polar organic molecules and asphaltene (C10+) contents, to evaluate the effectiveness of the injection and whether adjustments should be made to injection fluid amounts and compositions containing nanoparticles.

The nanoparticles exhibit inhibition mechanism with respect to asphaltene deposition, reducing the molecule interaction and agglomeration of asphaltenes. In some embodiments, the nanoparticles can be applied to change rock surface wettability mechanism and improve oil relative permeability. In some embodiments, the nanoparticle can be applied to alter the interfacial surface tension to improve oil recovery. To enhance particle dispersivity in injection fluid in reservoir brine, a number of surfactants such as sodium dodecyl sulfate (SDS), sodium laurilsulfate, sodium lauryl sulfate (SLS), or any combination thereof can be added to an injection stream in an EOR/IOR application. In some embodiments, the use of the nanoparticles change the rock surface polarity mechanism to prevent the adsorption of the asphaltene molecules and its agglomerates to the surface.

In one embodiment with the injection of nanoparticles, asphaltene precipitation in terms of skin damage reduction is expected to be at least 30% compared to an injection without the nanoparticles. The effectiveness of the nanoparticles in mitigating asphaltene precipitation can also be expressed as an increase in productivity as a result of wettability alteration. In one embodiment with the application of nanoparticles, permeability in the formation is expected to be restored after damage with the asphaltene to at least 30% after treatment with the nanoparticles. The increase is at least 50% in a second embodiment, or at least 60% in a third embodiment. In another embodiment, the asphaltenes are adsorbed onto the nanoparticles resulting in a reduction of asphaltene formation of at least 30%. In another embodiment, the asphaltenes are adsorbed onto the nanoparticles resulting in a reduction of asphaltene formation of up to 30%. In another embodiment, the asphaltenes are adsorbed onto the nanoparticles resulting in a reduction of asphaltene formation of 30% to 70%. In another embodiment, the recovered fluids produced from the hydrocarbon-bearing zone having the reduced concentration of asphaltenes may be analyzed to determine if the reduced concentration of asphaltenes meets a pre-determined target. In some embodiments, the fluids in the hydrocarbon-bearing zone have an initial asphaltene content of at least 0.01 wt % prior to the injection of the combination of the injection fluid and the nanoparticles.

Treatment of Producer Well:

The nanoparticles can be used as a treatment fluid in a well workover, completion, well stimulation, or any combination thereof to treat a near-wellbore zone around a producer well. The nanoparticles in one embodiment result in an induced precipitation effect to prematurely deposit the asphaltene in the interwell space, thus substantially reducing the asphaltene in the near-wellbore zone around the producer well/production wellbore.

One embodiment of this method comprises: (a) providing a subterranean reservoir comprising one or more hydrocarbons therewithin; (b) providing a wellbore in fluid communication with the subterranean reservoir; (c) injecting a fluid comprising the nanoparticles into the reservoir through a capillary string or a coiled tube at a pressure higher than the formation pressure; (d) ceasing the injection to let the injection fluid "soak" in the reservoir for a sufficient period of time for asphaltenes to be adsorbed onto the nanoparticles, e.g., at least 3 hours in one embodiment, at least 8 hours in a second embodiment, or at least 24 hours in a third embodiment; and (e) opening the well for injected fluid to flow back to the surface for oil to be produced back from the "treated" well at a higher rate than before treatment with the nanoparticles. Samples of hydrocarbons, e.g., crudes, are collected and analyzed for polar organic molecules and asphaltene (C10+) contents, and to evaluate the effectiveness of the injection. In one embodiment, the wellbore is re-injected with a treatment fluid comprising the nanoparticles after a period of production time, e.g., from a few months to a year.

Of note, in some embodiments, the combination of the injection fluid and the nanoparticles is allowed to soak in the hydrocarbon-bearing zone for a sufficient amount of time for the asphaltenes to be adsorbed onto the nanoparticles resulting in a reduction of asphaltene formation of at least 30%. In some embodiments, the combination of the injection fluid and the nanoparticles is allowed to soak in the hydrocarbon-bearing zone for a period of 3 to 6 hours. In some embodiments, the combination of the injection fluid and the nanoparticles is allowed to soak in the hydrocarbon-bearing zone for a period of 6 to 24 hours. In some embodiments, the combination of the injection fluid and the nanoparticles is allowed to soak in the hydrocarbon-bearing zone for a plurality of days (e.g., up to 30 days in some embodiments, or a sufficient amount of days for the nanoparticles to mitigate asphaltene formation with little to no plugging of the hydrocarbon-bearing zone by the nanoparticles in other embodiments).

IOR/EOR Applications:

The nanoparticles can be added to injection fluids in practically any IOR/EOR application, such as water flooding, gas flooding, polymer flooding, WAG, FAWAG, SWAG, or any combination thereof. In one embodiment, oil recovery proceeds until oil production at the production well declines to a predetermined level. Nanoparticles are added to an injection stream to mitigate asphaltene formation, and injection is initiated in an injection well which is in fluid communication with the hydrocarbon-bearing zone. The injection cycle with nanoparticles can continue and be repeated as often as desired while oil is continuously produced from the production well. Some embodiments include displacing the fluids in the hydrocarbon-bearing zone toward a production well with the combination of the injection fluid and the nanoparticles and recovering the fluids produced from the hydrocarbon-bearing zone having the reduced concentration of asphaltenes from the production wellbore. In some embodiments, the combination of the injection fluid and the nanoparticles is injected into an injection well that is in fluid communication through the hydrocarbon-bearing zone with the production wellbore. In some embodiments, the combination of the injection fluid and the nanoparticles is injected into a production wellbore in a sufficient amount to provide a radial volume of 3 to 50 ft. surrounding the production wellbore, and the hydrocarbons with the reduced concentration of asphaltenes is recovered from the production wellbore.

In one embodiment, the injection gas containing nanoparticles is a produced gas, e.g., natural gas, which has been produced from the same formation or a different formation from that which is being flooded. In one embodiment, the bulk of the injection gas comprises methane. The gas is injected into the formation without having undergone substantial processing or enrichment, although in some cases inorganic components of the produced gas, such as carbon dioxide, hydrogen sulfide, or any combination thereof, may be reduced or removed for operational purposes to reduce metallurgical corrosion during reinjection. In another embodiment, if produced gas is not readily available, alternative gasses may be used including onshore sourced methane, carbon dioxide, nitrogen, or any combination thereof.

The gas is injected into the hydrocarbon-bearing zone at a pressure within a range which is below the formation fracturing pressure but above the minimum miscibility pressure of the injection gas in the oil in place, and above the bubble point pressure of the oil. The minimum miscibility pressure is defined as the pressure at which the interfacial tension between an oil and a gas approximates zero at their contact point. The actual gas injection pressure is selected within the above-recited range by considering a number of factors, including the incremental oil recovery which can be achieved for a given injection pressure and volume of injected gas, the size and cost required to compress gas to a given pressure, number of compressor trains, and high/ultra pressure compressor technology development challenges.

In another embodiment, the injection stream contains water. Produced brine or sea water are preferred injection waters because of their availability and low cost, as well as low risk of clay damage. It is also possible, although not necessary, to include additives other than nanoparticles in the injection fluid, such as surfactants, polymers, or any combination thereof, to further enhance the ability of the injection water to displace oil to the production well.

In one embodiment for a WAG or SWAG operation, the level of oil recovery is the primary variable which determines the duration and volume of each fluid injection sequence, and whether nanoparticles are to be injected with the water or the gas injection. As the injection sequence continues the level of oil recovery peaks and then declines. At some predetermined point on the decline curve, the injection sequence for that particular fluid is terminated and the injection sequence for the alternate fluid begins. The termination point is often a function of the particular formation characteristics and the type of injection and production fluids. In most cases it can be predetermined by experimental or theoretical modeling.

For a WAG/SWAG operation, the volumetric ratio of water to gas injected into the formation during a given injection cycle is typically about 1:1 where the gas volume is based on formation conditions. This volumetric ratio of water to gas generally maximizes oil recovery. However, in some cases it may be preferable to inject a smaller volume of gas than water where gas injection is significantly more expensive than water injection. In such cases reduced, but acceptable, levels of oil recovery can be achieved with water to gas injection ratios of up to 4:1 or more. The relative volumes of fluids injected from cycle to cycle can also vary significantly depending on the effectiveness of the nanoparticles in mitigating asphaltene formation.

Figure 1:
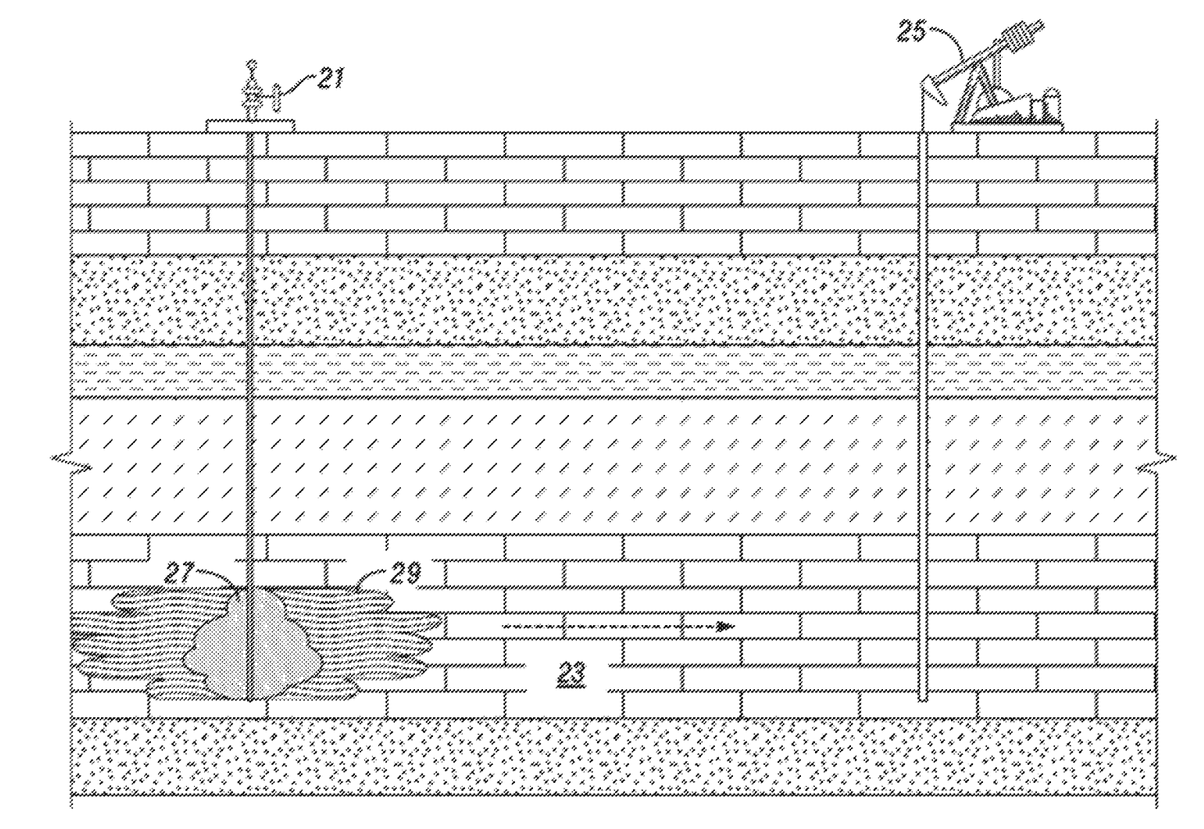
FIG. 1 is a schematic sectional view of a reservoir that is in fluid communication with an injection well and a production well in operation after injection of nanoparticles in accordance with one embodiment of the invention.

Reference will be made to the Figure, showing an embodiment of the invention. In FIG. 1, an injection well 21 is illustrated extending to a portion of a subterranean reservoir 23, which contains hydrocarbons for production. Injection well 21 is in fluid communication with subterranean reservoir 23 and the hydrocarbons therewithin. Production well 25 is positioned a predetermined distance away from injection well 21 and is also in fluid communication with reservoir 23 in order to receive the hydrocarbons therefrom. There can be additional production wells 25 spaced apart from injection well 21 at predetermined locations to optimally receive the hydrocarbons being pushed through reservoir 23 due to injections from injection well 21.

To determine a composition containing nanoparticles for injection into a given reservoir to mitigate asphaltene formation, parameters of the reservoir are usually measured or considered. Such parameters include but are not limited to reservoir permeability, amount of reservoir water, reservoir physical properties such as reservoir temperature and pressure, characteristics of hydrocarbons from the reservoir. A core flood measurement with the core of the targeted reservoir may also be employed using a range of injection fluid amounts and different compositions containing nanoparticles.

In an embodiment, an injection fluid containing nanoparticles 27 is injected through injection well 21 into reservoir 23. The injection fluid 27 disperses through reservoir 23, with at least a portion thereof proceeding toward production well 25. Asphaltenes in the formation are adsorbed into nanoparticles, resulting in enhanced sweep efficiency as the injection fluid proceed toward production well as flood front 29. While not shown in the Figure, the injection fluid can be continuously or intermittently injected through injection well 21 into reservoir 23 in an improved or enhanced oil recovery operation. Nanoparticles can be intermittently or continuously added to injection fluid 21.

For the purposes of this specification and appended claims, unless otherwise indicated, all numbers expressing quantities, percentages or proportions, and other numerical values used in the specification and claims are to be understood as being modified in all instances by the term "about." Accordingly, unless indicated to the contrary, the numerical parameters set forth in the following specification and attached claims are approximations that can vary depending upon the desired properties sought to be obtained by the present invention. This term "about" generally refers to a range of numbers that one of ordinary skill in the art would consider as a reasonable amount of deviation to the recited numeric values (i.e., having the equivalent function or result). For example, this term "about" can be construed as including a deviation of ±10 percent of the given numeric value provided such a deviation does not alter the end function or result of the value. Therefore, a value of about 1% can be construed to be a range from 0.9% to 1.1%.

As used herein, the term "include" and its grammatical variants are intended to be non-limiting, such that recitation of items in a list is not to the exclusion of other like items that can be substituted or added to the listed items. The terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Accordingly, these terms are intended to not only cover the recited element(s) or step(s), but may also include other elements or steps not expressly recited. Unless otherwise defined, all terms, including technical and scientific terms used in the description, have the same meaning as commonly understood by one of ordinary skill in the art to which this invention belongs.

While various embodiments are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. Also, the terms in the claims have their plain, ordinary meaning unless otherwise explicitly and clearly defined by the patentee. If there is any conflict in the usages of a word or term in this specification and one or more patent or other documents that may be incorporated herein by reference, the definitions that are consistent with this specification should be adopted.

Furthermore, as used herein, the use of the terms "a" or "an" when used in conjunction with an element may mean "one," but it is also consistent with the meaning of "one or more," "at least one," and "one or more than one." Thus, it is noted that, as used in this specification and the appended claims, the singular forms "a," "an," and "the," include plural references unless expressly and unequivocally limited to one referent. As used herein, the term "include" and its grammatical variants are intended to be non-limiting, such that recitation of items in a list is not to the exclusion of other like items that can be substituted or added to the listed items. As used herein, the use of "may" or "may be" indicates that a modified term is appropriate, capable, or suitable for an indicated capacity, function, or usage, while taking into account that in some circumstances the modified term may sometimes not be appropriate, capable, or suitable. Furthermore, unless explicitly dictated by the language, the term "and" may be interpreted as "or" in some instances.

It is understood that when combinations, subsets, groups, etc. of elements are disclosed (e.g., combinations of components in an item, or combinations of steps in a method), that while specific reference of each of the various individual and collective combinations and permutations of these elements may not be explicitly disclosed, each is specifically contemplated and described herein. By way of example, if an item is described herein as including a component of type A, a component of type B, a component of type C, or any combination thereof, it is understood that this phrase describes all of the various individual and collective combinations and permutations of these components. For example, in some embodiments, the item described by this phrase could include only a component of type A. In some embodiments, the item described by this phrase could include only a component of type B. In some embodiments, the item described by this phrase could include only a component of type C. In some embodiments, the item described by this phrase could include a component of type A and a component of type B. In some embodiments, the item described by this phrase could include a component of type A and a component of type C. In some embodiments, the item described by this phrase could include a component of type B and a component of type C. In some embodiments, the item described by this phrase could include a component of type A, a component of type B, and a component of type C. In some embodiments, the item described by this phrase could include two or more components of type A (e.g., A1 and A2). In some embodiments, the item described by this phrase could include two or more components of type B (e.g., B1 and B2). In some embodiments, the item described by this phrase could include two or more components of type C (e.g., C1 and C2). In some embodiments, the item described by this phrase could include two or more of a first component (e.g., two or more components of type A (A1 and A2)), optionally one or more of a second component (e.g., optionally one or more components of type B), and optionally one or more of a third component (e.g., optionally one or more components of type C). In some embodiments, the item described by this phrase could include two or more of a first component (e.g., two or more components of type B (B1 and B2)), optionally one or more of a second component (e.g., optionally one or more components of type A), and optionally one or more of a third component (e.g., optionally one or more components of type C). In some embodiments, the item described by this phrase could include two or more of a first component (e.g., two or more components of type C (C1 and C2)), optionally one or more of a second component (e.g., optionally one or more components of type A), and optionally one or more of a third component (e.g., optionally one or more components of type B).

Unless defined otherwise, all technical and scientific terms used herein have the same meanings as commonly understood by one of skill in the art to which the disclosed invention belongs.

This written description uses examples to disclose the invention, including the best mode, and also to enable any person skilled in the art to make and use the invention. The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims. All citations referred herein are expressly incorporated herein by reference. It is to be expressly understood, however, that each of the figures is provided for the purpose of illustration and description only and is not intended as a definition of the limits of the present invention.

The invention claimed is:

1. A method of inhibiting asphaltene formation, the method comprises:
    providing an injection fluid comprising water, foam, carbon dioxide, natural gas, methane, ethane, nitrogen, propane, butane, flue gas, exhaust gas, steam, alkali, polymer, surfactant, or any combination thereof;
    providing nanoparticles comprising iron oxide, magnetite, iron octanoate, or any combination thereof, wherein each of the nanoparticles is coated by functionalizing with alkylphenol resins, aldehyde resins, sulfonated resins, polyolefin esters, amides, imides with alkyl, alkylenephenyl functional group, alkylenepyridyl functional groups, alkenyl and vinylpyrrolidone copolymers, graft polymers of polyolefins, hyperbranched polyester amides, lignosulfonates, alkylaromatics, alkylaryl sulfonic acids, phosphoric esters, phosphinocarboxylic acids, sarcosinates, amphoteric surfactants, ether carboxylic acids, aminoalkylene carboxylic acids, alkylphenols and ethoxylates, imidazolines and alkylamide-imidazolines, alkylsuccinimides, alkylpyrrolidones, fatty acid amides and ethoxylates thereof, fatty esters of polyhydric alcohols, ion-pair salts of imines and organic acids, triethyl amine groups, triethanolamine lauryl ether sulfate, linear and branched dodecyl benzene sulfonic acid (DBSA), polymers with protic polar heads, or any combination thereof;
    injecting a combination of the injection fluid and the coated nanoparticles into a hydrocarbon-bearing zone, wherein the coated nanoparticles adsorb asphaltenes in the hydrocarbon-bearing zone, thereby inhibiting asphaltene deposition, reducing asphaltene molecule interaction, reducing agglomeration of asphaltenes, or any combination thereof such that asphaltene formation is reduced compared to injection without the coated nanoparticles; and
    recovering fluids produced from the hydrocarbon-bearing zone, the fluids having a reduced concentration of asphaltenes compared to injection without the coated nanoparticles.

2. The method of claim 1, wherein the asphaltene formation comprises precipitation, flocculation, deposition, or any combination thereof.

3. The method of claim 1, wherein the asphaltenes are adsorbed onto the coated nanoparticles resulting in a reduction of asphaltene formation of at least 30%.

4. The method of claim 1, wherein the asphaltenes are adsorbed onto the coated nanoparticles resulting in a reduction of asphaltene formation of up to 30%.

5. The method of claim 1, wherein the asphaltenes are adsorbed onto the coated nanoparticles resulting in a reduction of asphaltene formation of 30% to 70%.

6. The method of claim 1, wherein the coated nanoparticles are at a concentration of between 5 ppm to 200,000 ppm in the combination of the injection fluid and the coated nanoparticles.

7. The method of claim 1, wherein the coated nanoparticles are at a concentration of between 5 ppm to 10,000 ppm in the combination of the injection fluid and the coated nanoparticles.

8. The method of claim 1, wherein the coated nanoparticles are at a concentration of between 50 ppm to 10,000 ppm in the combination of the injection fluid and the coated nanoparticles.

9. The method of claim 1, wherein the coated nanoparticles are at a concentration of 0.01 weight percent in the combination of the injection fluid and the coated nanoparticles.

10. The method of claim 1, wherein the coated nanoparticles are at a concentration of 0.001 to 0.1 weight percent in the combination of the injection fluid and the coated nanoparticles.

11. The method of claim 1, further comprising:
displacing the fluids in the hydrocarbon-bearing zone toward a production wellbore with the combination of the injection fluid and the coated nanoparticles; and
recovering the fluids produced from the hydrocarbon-bearing zone having the reduced concentration of asphaltenes from the production wellbore.

12. The method of claim 11, wherein the combination of the injection fluid and the coated nanoparticles is injected into an injection well that is in fluid communication through the hydrocarbon-bearing zone with the production wellbore.

13. The method of claim 1, wherein the combination of the injection fluid and the coated nanoparticles is injected into a production wellbore in a sufficient amount to provide a radial volume of 3 to 50 ft. surrounding the production wellbore, and wherein the hydrocarbons with the reduced concentration of asphaltenes is recovered from the production wellbore.

14. The method of claim 1, further comprising analyzing the recovered fluids produced from the hydrocarbon-bearing zone having the reduced concentration of asphaltenes to determine if the reduced concentration of asphaltenes meets a pre-determined target.

15. The method of claim 1, wherein the combination of the injection fluid and the coated nanoparticles is allowed to soak in the hydrocarbon-bearing zone for a sufficient amount of time for the asphaltenes to be adsorbed onto the coated nanoparticles resulting in a reduction of asphaltene formation of at least 30%.

16. The method of claim 1, wherein the combination of the injection fluid and the coated nanoparticles is allowed to soak in the hydrocarbon-bearing zone for a period of 3 to 6 hours.

17. The method of claim 1, wherein the combination of the injection fluid and the coated nanoparticles is allowed to soak in the hydrocarbon-bearing zone for a period of 6 to 24 hours.

18. The method of claim 1, wherein the combination of the injection fluid and the coated nanoparticles is allowed to soak in the hydrocarbon-bearing zone for a plurality of days.

19. The method of claim 1, wherein the coated nanoparticles by functionalizing are further surface coated with a silica coating, a chelator-functionalized silica coating, a polyethylene glycol coating, a functionalized silicate coating, or any combination thereof.

20. The method of claim 1, wherein the coated nanoparticles are provided in a solvent solution comprising methanol, toluene, isopropyl alcohol, hexane, acetone, choloroform, dichloromethane, tributylphosphate, isopropanol, ethyl acetate, alkylbenzene, tetrahydrofuran, acetonitrile, or any combination thereof.

21. The method of claim 1, wherein the injection fluid further comprises an additive, and wherein the additive comprises surfactants, monovalent ions, multivalent ions, polymers, or any combination thereof.

22. The method of claim 1, wherein the combination of the injection fluid and the coated nanoparticles is injected into the hydrocarbon-bearing zone as a discrete slug in a Water-Alternating-Gas (WAG) operation.

23. The method of claim 22, wherein the discrete slug containing the coated nanoparticles is a liquid slug followed by a gas slug without the coated nanoparticles.

24. The method of claim 22, wherein the discrete slug containing the coated nanoparticles is a gas slug followed by a liquid slug without the coated nanoparticles.

25. The method of claim 1, wherein the fluids in the hydrocarbon-bearing zone have an initial asphaltene content of at least 0.01 wt % prior to the injection of the combination of the injection fluid and the coated nanoparticles.

26. The method of claim 1, wherein the injection fluid comprises natural gas, carbon dioxide, nitrogen, or any combination thereof under critical or supercritical condition such that the injection gas is a dense fluid.

27. The method of claim 1, wherein the injection fluid is injected in a sufficient amount for an effective pore volume based on rock reservoir porosity ranging from 0.20 to 20 hydrocarbon pore volume percent.

28. The method of claim 1, wherein the injection fluid comprises a combination of water and gas, wherein the water corresponds to a water injection well and the gas corresponds to a gas injection well.

29. The method of claim 1, wherein the coated nanoparticles are intermittently or continuously added to the injection fluid to inhibit asphaltene formation during an improved or enhanced oil recovery operation.

30. The method of claim 1, wherein the coated nanoparticles further act as a dispersant of asphaltenes.

31. The method of claim 1, wherein the coated nanoparticles change at least one of a rock surface wettability or a rock surface polarity of a rock surface in the hydrocarbon-bearing zone to prevent adsorption of asphaltenes onto the rock surface.

32. The method of claim 1, wherein deposition of asphaltenes in the hydrocarbon-bearing zone prior to the injection of the combination of the injection fluid and the coated nanoparticles is determined via core flood measurements using a core sample from the hydrocarbon-bearing zone, and the injection of the combination of the injection fluid and the coated nanoparticles in the hydrocarbon-bearing zone is triggered in response to the core flood measurements indicating an initial asphaltene content of at least 0.01 wt %.

33. The method of claim 1, wherein the coated nanoparticles comprise a large surface to volume ratio with a surface area of 1 $m^2/g$ to 1800 $m^2/g$ and a particle size of 1 nm to 100 nm.

34. The method of claim 1, wherein the coated nanoparticles further comprise nickel oxide, alumina, silica, silicate, impregnated nickel on alumina, synthetic clay, iron zinc sulfide, or any combination thereof.

35. The method of claim 1, wherein the coated nanoparticles are coated with organic functionality of acidic polarity.

36. The method of claim 1, wherein the injection of the combination of the injection fluid and the coated nanoparticles into the hydrocarbon-bearing zone is through a capillary string.

37. The method of claim 1, wherein the coated nanoparticles have adsorption capacity, the coated nanoparticles are catalytically active, or any combination thereof.

38. A method of inhibiting asphaltene formation, the method comprises:

providing an injection fluid comprising water, foam, carbon dioxide, natural gas, methane, ethane, nitrogen, propane, butane, flue gas, exhaust gas, steam, alkali, polymer, surfactant, or any combination thereof;

providing coated nanoparticles comprising iron oxide, magnetite, iron octanoate, or any combination thereof, wherein each of the nanoparticles is surface coated with a silica coating, a chelator-functionalized silica coating, a polyethylene glycol coating, a functionalized silicate coating, or any combination thereof;

injecting a combination of the injection fluid and the coated nanoparticles into a hydrocarbon-bearing zone, wherein the coated nanoparticles adsorb asphaltenes in the hydrocarbon-bearing zone, thereby inhibiting asphaltene deposition, reducing asphaltene molecule interaction, reducing agglomeration of asphaltenes, or any combination thereof such that asphaltene formation is reduced compared to injection without the coated nanoparticles; and recovering fluids produced from the hydrocarbon-bearing zone, the fluids having a reduced concentration of asphaltenes compared to injection without the coated nanoparticles.

39. The method of claim 38, wherein the surface coated nanoparticles are further coated by functionalizing with alkylphenol resins, aldehyde resins, sulfonated resins, polyolefin esters, amides, imides with alkyl, alkylenephenyl functional group, alkylenepyridyl functional groups, alkenyl and vinylpyrrolidone copolymers, graft polymers of polyolefins, hyperbranched polyester amides, lignosulfonates, alkylaromatics, alkylaryl sulfonic acids, phosphoric esters, phosphinocarboxylic acids, sarcosinates, amphoteric surfactants, ether carboxylic acids, aminoalkylene carboxylic acids, alkylphenols and ethoxylates, imidazolines and alkylamide-imidazolines, alkyl succinimides, alkylpyrrolidones, fatty acid amides and ethoxylates thereof, fatty esters of polyhydric alcohols, ion-pair salts of imines and organic acids, triethyl amine groups, triethanolamine lauryl ether sulfate, linear and branched dodecyl benzene sulfonic acid (DBSA), polymers with protic polar heads, or any combination thereof.

* * * * *